United States Patent
Nunzi et al.

(10) Patent No.: US 9,264,921 B2
(45) Date of Patent: Feb. 16, 2016

(54) METHOD AND SYSTEM FOR MEASURING NETWORK OPERATION RELATED PARAMETERS IN A MOBILE COMMUNICATION NETWORK

(75) Inventors: Giorgio Nunzi, Heidelberg (DE); Caroline Jactat, Paris (FR); Hisashi Futaki, Kanagawa (JP)

(73) Assignees: NEC EUROPE LTD., Heidelberg (DE); NEC CORPORATION, Tokyo (JP)

( * ) Notice: Subject to any disclaimer, the term of this patent is extended or adjusted under 35 U.S.C. 154(b) by 0 days.

(21) Appl. No.: 14/234,155

(22) PCT Filed: Jul. 23, 2012

(86) PCT No.: PCT/EP2012/064380
§ 371 (c)(1),
(2), (4) Date: Mar. 21, 2014

(87) PCT Pub. No.: WO2013/014119
PCT Pub. Date: Jan. 31, 2013

(65) Prior Publication Data
US 2014/0194109 A1  Jul. 10, 2014

(30) Foreign Application Priority Data
Jul. 22, 2011  (EP) .................................... 11006014

(51) Int. Cl.
*H04M 3/00*  (2006.01)
*H04W 24/02*  (2009.01)
*H04W 24/08*  (2009.01)

(52) U.S. Cl.
CPC .............. *H04W 24/02* (2013.01); *H04W 24/08* (2013.01)

(58) Field of Classification Search
CPC ..... H04W 24/10; H04W 24/08; H04W 24/02; H04W 64/00; H04W 4/02; H04W 36/32; H04W 24/00; H04W 36/30; H04W 16/18; H04W 72/085; H04W 16/08; H04W 24/04; H04W 36/36; H04W 48/18; H04W 52/0209
USPC ........................................................ 455/418
See application file for complete search history.

(56) References Cited

U.S. PATENT DOCUMENTS

2009/0227251 A1  9/2009  Lei et al.
2010/0190488 A1*  7/2010  Jung et al. ..................... 455/424
(Continued)

FOREIGN PATENT DOCUMENTS

WO  2006/063309 A2  6/2006
WO  2010/145531 A1  12/2010
(Continued)

OTHER PUBLICATIONS

International Search Report, dated Sep. 25, 2012, from corresponding PCT application.
(Continued)

*Primary Examiner* — Kwasi Karikari
(74) *Attorney, Agent, or Firm* — Young & Thompson

(57) ABSTRACT

A method for measuring network operation related parameters in a mobile communication network with a core network and a radio-access network, preferably in form of a LTE- or UMTS-network, includes the steps of a) configuring an entity in the mobile communication network for measuring including network operation related parameters to be measured, b) selecting a measuring entity, c) measuring the network operation related parameters by the measuring entity, and d) analyzing the measured parameters wherein a filtering is performed prior to step d), wherein the filtering is performed on an entity in the radio access network of the mobile communication network and wherein the filtering reduces the amount of data of the measured network operation related parameters for step d). A system for measuring network operation related parameters is also described.

14 Claims, 7 Drawing Sheets

(56) References Cited

U.S. PATENT DOCUMENTS

| | | | |
|---|---|---|---|
| 2011/0201279 A1* | 8/2011 | Suzuki et al. | 455/67.11 |
| 2011/0269402 A1* | 11/2011 | Yi et al. | 455/67.11 |
| 2011/0287793 A1* | 11/2011 | Tenny et al. | 455/507 |
| 2012/0054304 A1* | 3/2012 | Pica et al. | 709/217 |
| 2012/0088457 A1 | 4/2012 | Johansson et al. | |

FOREIGN PATENT DOCUMENTS

| | | |
|---|---|---|
| WO | 2011/093665 A2 | 8/2011 |
| WO | 2012/113435 A1 | 8/2012 |

OTHER PUBLICATIONS

"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10)", 3GPP Standard; 3GPP TS 37.320, 3rd Generation Partnership Project (3GPP), Dec. 21, 2010, pp. 1-17, No. V10.0.0.

* cited by examiner

METHOD AND SYSTEM FOR MEASURING NETWORK OPERATION RELATED PARAMETERS IN A MOBILE COMMUNICATION NETWORK

BACKGROUND OF THE INVENTION

1. Field of the Invention

The present invention relates to a method for measuring network operation related parameters in a mobile communication network with a core network and a radio-access network, preferably in form of a LTE- or UMTS-network, comprising the steps of
   a) Configuring an entity in the mobile communication network for measuring including network operation related parameters to be measured,
   b) Selecting a measuring entity,
   c) Measuring the network operation related parameters by the measuring entity, and
   d) Analysing the measured parameters.

The present invention also relates to a system for measuring network operation related parameters in a mobile communication network with a core network and a radio access network, preferably in form of a LTE- or UMTS-network, comprising a measuring entity, preferably a user equipment, configured to be operable to perform network related measurements, preferably radio measurements, a configured entity, preferably a base station, to which the measuring entity is connectable, a configuring entity configured to be operable to configure the configured entity for measurement, including network operation related parameters to be measured, a selection entity configured to be operable to select the measuring entity connected to the configured entity, for measurement and an analyzing entity configured to be operable to analyse measured data of the network operation related parameters and connected to the configured entity.

Although applicable in general to measurements of a network operation related parameter, the present invention will be described with regard to measurements in form of minimization of drive tests.

Minimization of drive tests, abbreviated with MDT, is a method adopted in the 3GPP specifications for optimizing radio resources of a radio access network of a mobile communication network. When the minimization of drive tests is activated one or more user equipment are requested to perform radio related measurements for example measuring radio signal strengths. The data collected during these measurements is sent to a network entity in the mobile communication network.

Without these MDT-measurements technical people would have to perform these measurements so they have to move personally in the affected area with dedicated measurement devices.

The collected measurements are then stored in a dedicated entity, the so called Trace Collecting Entity TCE. Every time the user equipment provides collected data from MDT-measurements it reports them to the Trace Collecting Entity.

2. Description of the Related Art

In FIG. 1 a conventional signaling involved between different network elements in a LTE mobile communication network is shown. FIG. 2 shows a corresponding conventional system for a UMTS mobile communication network.

Referring now to FIG. 1 signaling involved between an element manager EM, a Mobility Management Entity MME, an evolved NodeB eNB, a user equipment UE and a Trace Collection Entity TCE is shown. In a first step S1 the mobility management entity MME request initial context set up and/or requests handover and/or requests user equipment context modification. Further the MME sends user consent indication information to the evolved NodeB eNB. Indeed the consent information indicate that a user has given his consent to participate in the MDT measurements. In a second step S2 user consent information is stored within the user equipment context at the evolved NodeB eNB.

In a third step S3 minimization of drive test MDT measurement is activated by the element manager EM and correspondingly signaled to the evolved NodeB eNB. The evolved NodeB eNB then starts in a fourth step S4 a trace session and stores MDT parameters.

In case user consent information has changed, in a fifth step S5 the mobility management entity MME requests initial context setup and/or requests handover and/or requests user equipment context modification. Furthermore the mobility management entity MME sends user consent indication information to the evolved NodeB eNB. In a sixth step S6 user consent information is stored within the user equipment context at the evolved NodeB eNB.

In a seventh step S7 the evolved NodeB eNB selects user equipment based on the received MDT parameters, for example including area scope and user consent. In an eighth step S8 the evolved NodeB activates the minimization of drive test measurements.

In a ninth step S9 the user equipment UE reports data collected during MDT measurements via RRC back to the evolved NodeB eNB. In a tenth step S10 the evolved NodeB eNB saves the data of the performed measurements by the user equipment to corresponding MDT records.

In an eleventh step S11 an anonymization level is checked, so that in the step S11a a type allocation code TAC could be sent and a cell traffic trace including TR and TRSR is provided by the evolved NodeB eNB to the mobility management entity MME. Otherwise in a step S11b no data is sent.

In a twelfth step S12 the mobility management entity MME sends the type allocation code TAC and TR as well as a TRSR to the trace collection entity TCE. In a thirteen step S13 the evolved NodeB eNB reports MDT records to the trace collection entity TCE and in a last fourteenth step S14 the MDT records are combined with a type allocation code TAC based on trace reference TR and trace recording session reference TRSR at the trace collection entity TCE.

One of the disadvantages is that in the seventh step S7 the evolved NodeB selects user equipment based on static information like area scope, i.e. cells in which a minimization of drive test MDT is performed, and/or information of user consent meaning that no minimization of drive tests MDT is performed if the user gave no consent. When a user equipment UE attaches to the evolved NodeB eNB this area scope and user consent are verified. If the user equipment UE satisfies these conditions then the minimization of drive tests is activated (step S8). The user equipment then performs measurements continuously and reports them—as mentioned above—in a ninth step S9 to the evolved NodeB. The evolved NodeB then takes care of forwarding the measurements to the trace collecting entity TCE which stores them in a database.

FIG. 2 shows a corresponding minimization of a drive test in a UMTS mobile communication system.

In a first step R1 the element manager EM sends a trace session activation including a configuration for the minimization of drive tests to a radio network controller RNC. In a second step R2 the radio network controller RNC starts a trace session by saving configuration parameters of the MDT configuration.

In a third step R3 the Serving Gatery Support Node SGSN respectively the mobile switching center MSC forwards user consent information to the radio network controller RNC. In a fourth step R4 the radio network controller RNC saves the received user consent information.

In a fifth step R5 user equipment are selected for performing MDT measurements based on area scope and user consent. In a sixth step R6 the radio network controller RNC activates MDT measurements on a user equipment UE1. The user equipment UE1 then measures continuously according to MDT and transmits in a seventh step R7 results of the measurements via RRC back to the radio network controller RNC.

In an eighth step R8 the radio network controller RNC saves the received MDT measurements to corresponding MDT records. The steps R7 and R8 may be again performed (steps R9 and R10) when continuously measuring. In an eleventh step R11 the radio network controller RNC reports the MDT records to the trace collecting entity TCE for further analysis.

FIG. 3 shows schematically a conventional system for performing MDT measurements by a user equipment and the signaling involved between the corresponding network entities. The element manager EM sends MDT configuration to one or more eNBs within a certain activation area. User equipment connected to the eNBs in the MDT measurement activation area are then performing the MDT measurements and report the results of the measurements to the corresponding eNBs. The eNBs then send then the data of the performed measurements for storage to the trace collecting entity TCE. The trace collecting entity TCE then provides the stored data for preprocessing and analysis to a user.

One of the disadvantages of the conventional systems and methods is that the amount of data collected by the MDT measurements is high, complicating a later analysis of the collected data.

A further disadvantage is that the user equipment, once determined for MDT measurements, measures continuously.

An even further disadvantage is that due to the large amount of data of the MDT measurements network resources are used to an high extent resulting in high energy consumption, in particular of the batteries of the user equipment, as well as a possible degradation of quality of service within the mobile communication network.

BRIEF SUMMARY OF THE INVENTION

It is therefore an objective of the present invention to provide a method and a system for measuring network operation related parameters in a mobile communication network which are more flexible with regard to the measurements of network operation related parameters.

It is a further objective of the present invention to provide a method and a system for measuring network operation related parameters in a mobile communication network which provide precise measurements while saving energy of involved network components of the mobile communication network.

It is an even further objective of the present invention to provide a method and a system for measuring network operation related parameters in a mobile communication network which enable a precise and more simple analysis of measured network operation related parameters.

It is an even further objective of the present invention to provide a method and a system for measuring network operation related parameters in a mobile communication network which enable a lesser usage of network resources.

The aforementioned objectives are accomplished by a method and system disclosed below.

The method for measuring network operation related parameters in a mobile communication network with a core network and a radio-access network, preferably in form of a LTE- or UMTS-network, comprises the steps of
a) Configuring an entity in the mobile communication network for measuring including network operation related parameters to be measured,
b) Selecting a measuring entity,
c) Measuring the network operation related parameters by the measuring entity, and
d) Analysing the measured parameters.

The method is characterized in that a filtering is performed prior to step d), wherein the filtering is performed on an entity in the radio access network of the mobile communication network and that the filtering reduces the amount of data of the measured network operation related parameters for step d).

The system for measuring network operation related parameters in a mobile communication network with a core network and a radio access network, preferably in form of a LTE or UMTS network, comprising a measuring entity, preferably a user equipment, configured to be operable to perform network related measurements, preferably radio measurements, a configured entity, preferably a base station, to which the measuring entity is connectable, a configuring entity configured to be operable to configure the configured entity for measurement, including network operation related parameters to be measured, a selection entity configured to be operable to select the measuring entity connected to the configured entity, for measurement and an analyzing entity configured to be operable to analyse measured data of the network operation related parameters and connected to the configured entity.

The system is characterized in that an entity in the radio access network of the mobile communication network is configured to be operable to perform a filtering before the analyzing entity analyses measured data of the network operation related parameters, wherein the filtering reduces the amount of the data of measured network operation related parameters.

According to the invention it has first been recognized that in particular by filtering prior to step d) data traffic within the mobile communication network is reduced.

According to the invention it has further been first recognized that by the filtering the use of network resources could be efficiently reduced thus saving energy.

According to the invention it has further been first recognized that in particular by filtering at least part of the signaling traffic within the radio access network of the mobile communication network is reduced.

Further features advantages and preferred embodiments are described in the following subclaims.

According to a preferred embodiment the filtering is performed on the configured entity, preferably a base station. One of the advantages of filtering by the configured entity, preferably the base station, is, that even further signaling traffic between the configured entity, preferably the base station, and the measuring entity, preferably a user equipment, can be avoided, since measuring entities which are not intended for measuring network operation related parameters are not provided with the corresponding information by the configured entity. Another advantage of performing a filtering by the configured entity, is, that the measurement of network operation related parameters, in particular of MDT measurements may be left unchanged. The measuring entity then reports the measurement back to the configured entity, and the configured entity then filters the received information of the performed measurements by the measuring entity before providing it to another entity.

According to a further preferred embodiment the filtering is performed prior to step c). When the filtering is performed prior to step c) signaling traffic between network entities is reduced, in particular with regard to signaling from and to the measuring entity. Further unnecessary measurements, performed by measuring entity are avoided: If the filtering would be performed after the measurements each measuring entity corresponding to configured entity is to perform the measurement on network operation related parameters. Some results of these measurements might be unusable and therefore have to be filtered out. This avoids a waste of network resources in particular with regard to for example a battery usage of a user equipment.

According to a further preferred embodiment the configured entity, preferably being an entity of the radio-access network, selects a user equipment connected to the configured entity as measuring entity. When selecting a user equipment as measuring entity real-time conditions with respect to its connectivity can be taken into account providing more precise results of the network operation related parameters.

According to a further preferred embodiment the filtering is performed by selecting and/or activating the measuring entity for measurement according to measuring entity internal properties, preferably the type of the measuring entity. By selecting and/or activating a measuring entity, preferably a user equipment according to internal properties for example only those user equipments are selected which are for example of a certain type or device or of a certain manufacturer of the user equipment. Therefore for example user equipment for which is known that they have a relatively low quality of antennas for measuring or bad quality in terms of signal strength, etc. compared with other user equipment maybe excluded from measuring: One advantage is, that then the user equipment does not produce measurement data which is at least partly unusable in particular for MDT measurement. On the other hand user equipment resources are saved to provide a better quality of service to the user by avoiding to perform further tasks by the user equipment. Internal properties may also include for example battery level, in battery performance, in type of internal chips, available memory, or the like.

According to a further preferred embodiment the filtering is performed by deselecting and/or deactivating the measuring entity for measurement according to step c). By deselecting and/or deactivating the measuring entity for measurement, for example based on dynamic conditions of the network or dynamic conditions of the evolved NodeB, in particular of the performance of the evolved NodeB which may be represented by the number of frames lost or the like, only measurements of interest may be continued thus reducing the amount of data to be analysed later. If for example the performance of the evolved NodeB is low or bad then filtering avoids an overload of the evolved NodeB if too many user equipment send their data back to the evolved NodeB and thus the bad performance of the evolved NodeB is not further decreasing.

According to a further preferred embodiment the network conditions are measured by another mobile communication network entity, preferably the base station, to which the measuring entity is connected. One of the advantages of another mobile communication network entity measuring the network conditions is, that for example the base station cannot only measure network conditions from and to user equipment but also further to core network entities. Also core network entities may provide enhanced network condition information to the mobile communication network entity which measures the network conditions. Therefore a more complete overview of network conditions may be taken into account enhancing the reliability of selecting and/or deselecting a user equipment for measurement and/or activating and/or deactivating measurements of a network operation related parameters.

According to a further preferred embodiment the filtering is performed according to measuring entities external information. External information may for example be local information like measured signal conditions, speed, position and/or location, type of location and/or position information like radio frequency, finger print, GPS information or the like. This enables a further refining of measuring entity selection for measuring network operation related parameters thus reducing the number of measuring entities efficiently without reducing the quality of the measurement of the network operation related parameters. Measuring entity external information may be reflecting real-time conditions of the aforementioned parameters like speed or received signals strengths or location. For example if real-time conditions are not respected, for example the received signal strength is very high or the measuring entity, preferably in form of a user equipment, is not moving or moving too fast, the corresponding user equipment is filtered out so the user equipment does not perform measuring network operation related parameters.

According to a further preferred embodiment step a) includes providing a list of internal properties, external information selecting, deselecting, activating and/or deactivating information. This enables a more easier configuration e.g. of evolved NodeBs, since the evolved NodeBs obtain important information not only for transmitting these information to the corresponding user equipment but to enable an efficient filtering. Further the flexibility for measuring network operation related parameters is enhanced, since different evolved NodeBs may be provided with different information for filtering so that the measurement of network operation related parameters by a user equipment take into account local or regional differences in the mobile communication network.

According to a further preferred embodiment the filtering is performed on the measuring entity, preferably a user equipment. When for example the filtering is performed on the user equipment as measuring entity real-time conditions of the user equipment can be taken into account, for example speed, received signal strength and/or allocation. If the real-time conditions are not met, for example the user equipment is not moving or moving too fast, then the filtering suppresses the measurement of the network operation related parameters. If the real-time conditions for example are met measurements are performed and reported to the evolved NodeB.

According to a further preferred embodiment the configured entity, preferably a base station provides measured network conditions to the measuring entity, preferably a user equipment connected to the base station. This even further enhances the reliability of filtering at the user equipment: The transmitted network conditions, which may not be measured by the user equipment, provide additional information so that a selection of user equipment for measuring network operation related parameters provide more precise and reliable results.

According to a further preferred embodiment the filtering is performed by executing at least one filtering rule, wherein filtering rules provide a filtering according to speed, received signal strength, allocation and/or battery level of the measuring entity and/or according to accuracy of a measurement performed by the measuring entity. One of the advantages is, that therefore filtering rules are implemented with important parameters which are related to the user equipment. For example the filtering rules may be based on a lesser-than comparison with a predetermined threshold defining a threshold, for the battery level of the user equipment: If the battery level is below the threshold measurement of network operation related parameters is not performed since otherwise the battery level of the user equipment is even further reducing the availability of the user equipment in total in the mobile communication network.

According to a further preferred embodiment the filtering is performed by executing at least one filtering rule wherein filtering rules provide a performance indicator and a corresponding threshold, preferably wherein a performance parameter represents a number of lost frames, number of called drops, number of frame errors and/or percentage of time in an overload condition. This enables a filtering on the base station considering dynamic conditions of the base station. If the performance of the evolved NodeB is low, filtering is performed at the base station to avoid a further decrease in performance due to signaling with the user equipment for measurement of network operation related parameters.

According to a further preferred embodiment selecting, deselecting, activating and/or deactivating the measuring entity for measurement is performed by dedicated signaling and/or broadcast corresponding commands to measuring entity. This enables a fast and reliable transmission of corresponding commands to measuring entities for measuring network operation related parameters. If such start and/or stop commands for measuring the network operation related parameters are sent through dedicated signaling, for example by extending RRC procedures between the user equipment and a base station, unnecessary signaling to other stations is avoided. If those commands are sent through broadcast signaling, no further extension of RRC procedures is necessary. Therefore this provides a simple and easy selection and/or deselecting of user equipment for measurement of network operation related parameters.

According to a further preferred embodiment the filtering at the configured entity is performed after step c). One of the advantages is, that the procedures in the configured entity for network operation related parameters by the measuring entity remain unchanged. For example, corresponding user equipment are activated, measurement is performed at the user equipment and the user equipment report their measurements back to the base station. The filtering is then performed after receiving the measurements and for storing the measurements, i.e. before transferring the measurements from the base station to a trace collection entity. Therefore forwarding of results of the measurement which are unusable is avoided and thus reducing the data traffic to the trace collection entity.

According to a further preferred embodiment of the system, the configuring entity and/or the analyzing entity are core network entities of the mobile communication network. This enables a centralized configuring of base stations for measurement of network operation related parameters by user equipment. A centralized analyzing entity avoids costly local analysis.

There are several ways how to design and further develop the teaching of the present invention in an advantageous way. To this end it is to be referred to the patent claims on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will be explained.

DETAILED DESCRIPTION OF THE PREFERRED EMBODIMENTS

Figure 1:
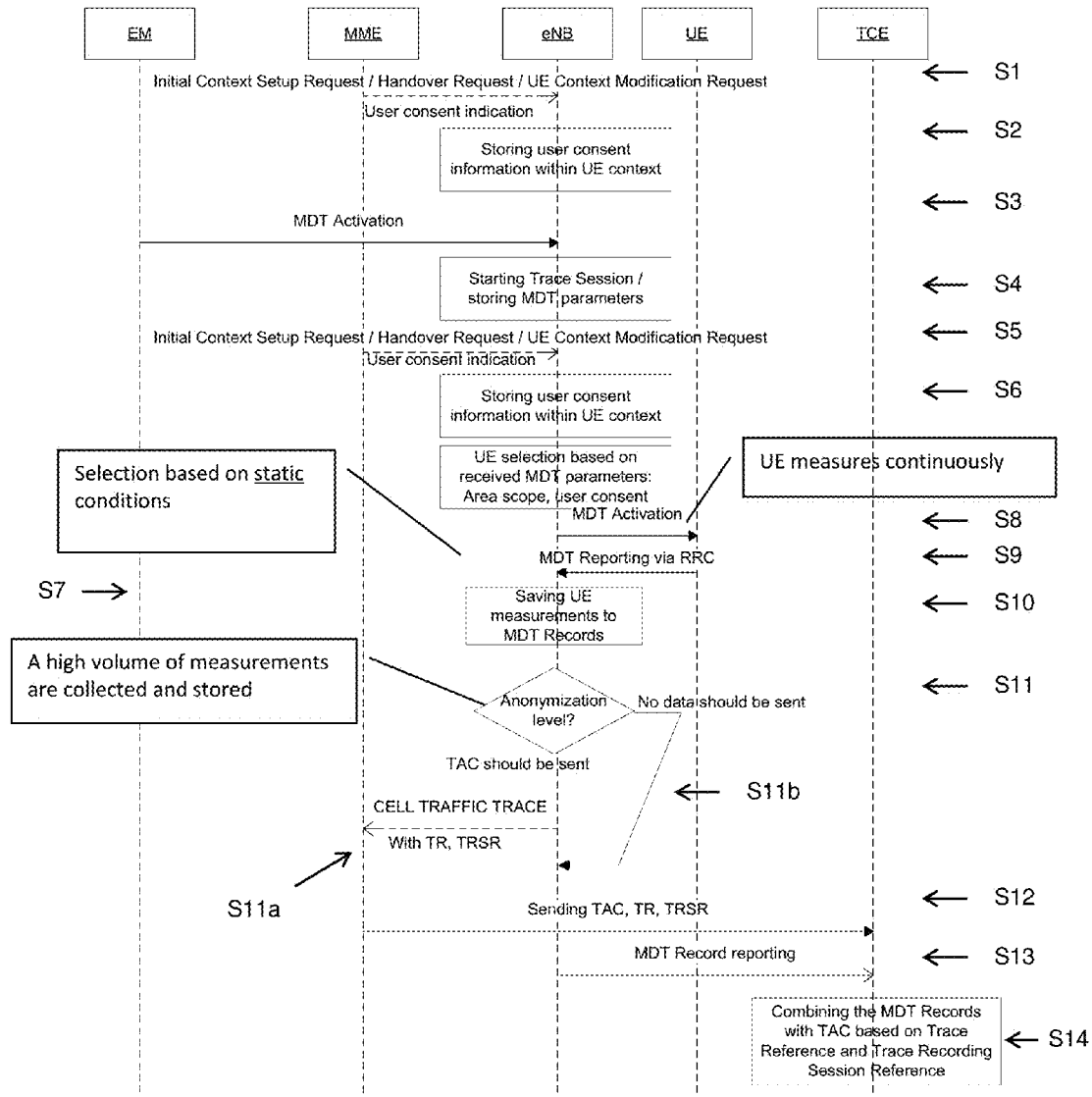
FIG. 1 shows a first conventional method for measuring network operation related parameters.
Figure 2:
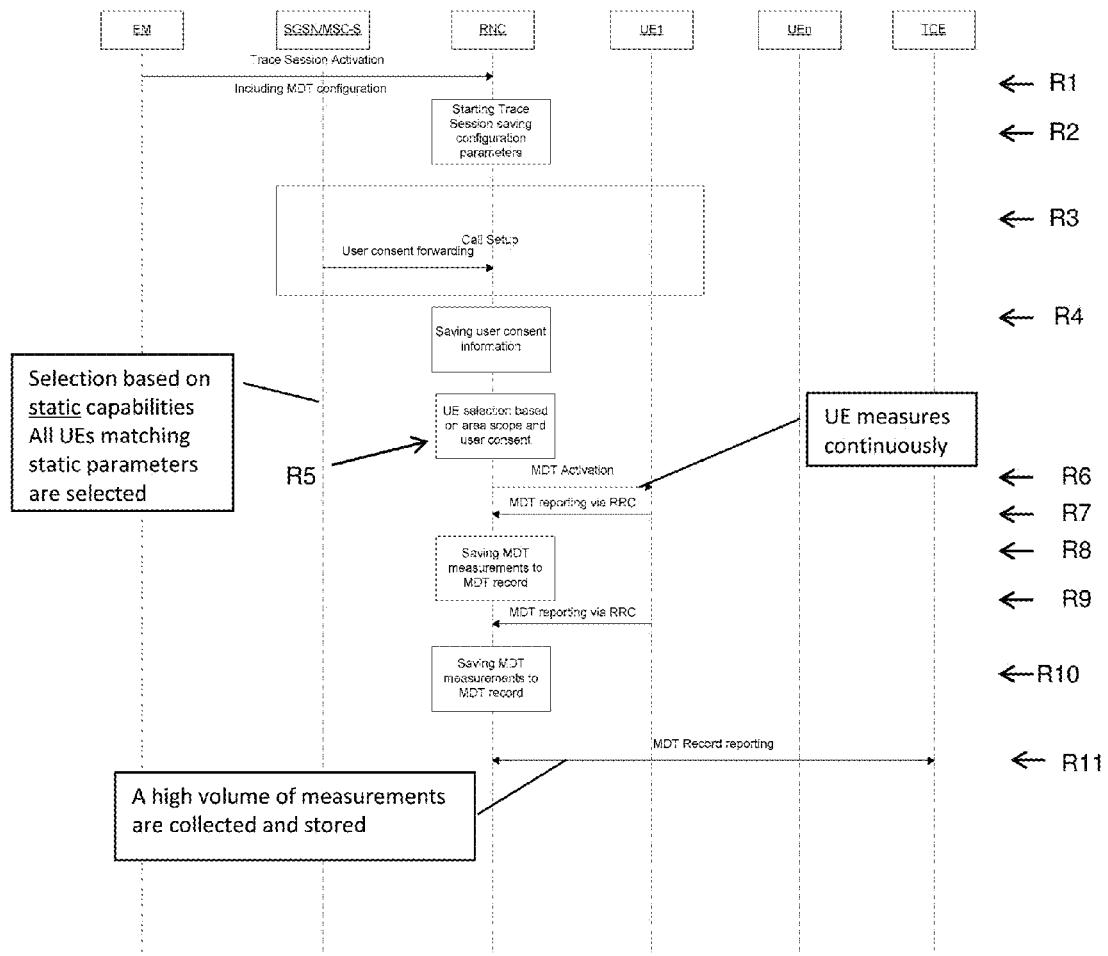
FIG. 2 shows a second conventional method for measuring network operation related parameters.

In FIG. 1 a conventional signaling involved between different network elements in a LTE mobile communication network is shown. FIG. 2 shows a corresponding conventional signaling for a UMTS mobile communication network.

Referring now to FIG. 1 a minimization of a drive test activation in E-UTRAN according to 3GPP specification signaling between an element manager EM, a Mobility Management Entity MME, an evolved NodeB eNB, a user equipment UE and a Trace Collection Entity TCE is shown. In a first step S1 the mobility management entity MME request initial context set up and/or requests handover and/or requests user equipment context modification. Further the MME sends user consent indication information to the evolved NodeB eNB. In a second step S2 user consent information is stored within the user equipment context at the evolved NodeB eNB. In a third step S3 minimization of drive test MDT measurement is activated by the element manager EM and correspondingly signaled to the evolved NodeB eNB. The evolved NodeBe then starts in a fourth step S4 a trace session and stores MDT parameters. In a fifth step S5 the mobility management entity MME requests initial context setup and/or requests handover and/or requests user equipment context modification. Furthermore the mobility management entity MME sends user consent indication information to the evolved NodeB eNB. In a sixth step S6 user consent information is stored within the user equipment context at the evolved NodeB eNB.

In a seventh step S7 the evolved NodeB eNB selects user equipment based on the received MDT parameters, for example including area scope and user consent. In an eighth step S8 the evolved NodeB activates the minimization of drive test measurements. In a ninth step S9 the user equipment UE reports data collected during MDT measurements via RRC back to the evolved NodeB eNB. In a tenth step S10 the evolved NodeB eNB saves the data of the performed measurements by the user equipment to corresponding MDT records. In an eleventh step S11 an anonymization level is checked, so that in a step S11a a type allocation code TAC could be sent and a cell traffic trace including TR and TRSR is provided by the evolved NodeB eNB to the mobility management entity MME. Otherwise in the step S11b no data is sent. In a twelfth step S12 the mobility management entity MME sends the type allocation code TAC and TR as well as a TRSR to the trace collection entity TCE. In a thirteen step S13 the evolved NodeB eNB reports MDT records to the trace collection entity TCE and in a last fourteenth step S14 the MDT records are combined with a type allocation code TAC based on trace reference TR and trace recording session reference TRSR at the trace collection entity TCE.

One of the disadvantages is, that in the seventh step S7 the evolved NodeB selects user equipment based on static information like area scope, i.e. cells in which a minimization of drive test MDT is performed, and/or information of user consent meaning that no minimization of drive tests MDT is performed if the user gave no consent. When an user equipment UE attaches to the evolved NodeB eNB this area scope and user consent are verified. If the user equipment UE satisfies this conditions, then the minimization of drive tests is activated (step S8).

The user equipment then performs measurements continuously and reports then—as mentioned above—in a ninth step S9 to the evolved NodeB. The evolved NodeB takes then care of forwarding the measurements to the trace collecting entity TCE which stores them in a database.

FIG. 2 shows a second conventional method for measuring network operation related parameters.

FIG. 2 shows a minimization of drive test activation in E-UTRAN according to 3GPP in a UMTS network.

In a first step R1 the element manager EM sends a trace session activation including a configuration for the minimization of drive tests to a radio network controller RNC. In a second step R2 the radio network controller RNC starts a trace session by saving configuration parameters of the MDT configuration. In a third step R3 the Serving Gatery Support Node SGSN respectively the mobile switching center MSC forwards user consent information to the radio network controller RNC. In a fourth step R4 the radio network controller RNC saves the received user consent information. In a fifth step R5 user equipment are selected for performing MDT measurements based on area scope and user consent. In a sixth step R6 the radio network controller RNC activates MDT measurements on a user equipment UE1. The user equipment UE1 then measures continuously according to MDT and transmits in a seventh step R7 results of the measurements via RRC back to the radio network controller RNC. In an eighth step R8 the radio network controller RNC saves the received MDT measurements to corresponding MDT records. The steps R7 and R8 maybe again performed (steps R9 and R10) when continuously measuring. In an eleventh step R11 the radio network controller RNC reports the MDT records to the trace collecting entity TCE for further analysis.

Figure 3:
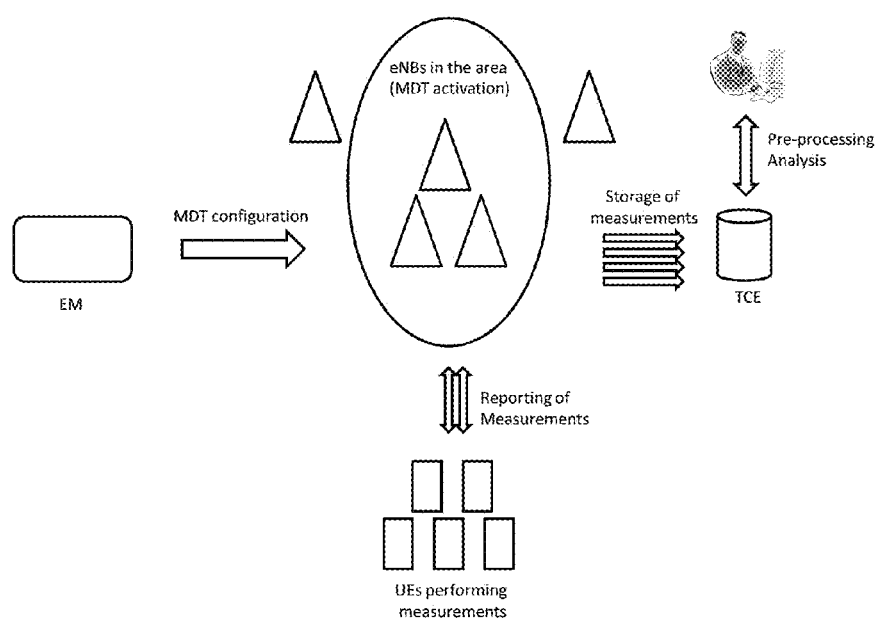
FIG. 3 shows a schematic view of signaling according to the FIGS. 1 and 2.

FIG. 3 shows a schematic view of signaling according to the FIGS. 1 and 2.

In FIG. 3 the conventional usage of minimization of drive tests in a mobile communication network is shown.

FIG. 3 shows schematically a conventional system for performing MDT measurements by a user equipment and the signaling involved between the corresponding network entities. The element manager EM sends MDT configuration to one or more eNBs within a certain activation area. User equipment connected to the eNBs in the activation area for MDT measurements are then performing the MDT measurements and report the results of the measurements to the corresponding eNBs. The eNBs then send then the data of the performed measurements for storage to the trace collecting entity TCE. The trace collecting entity TCE then provides the stored data for preprocessing and analysis to a user.

Figure 4:
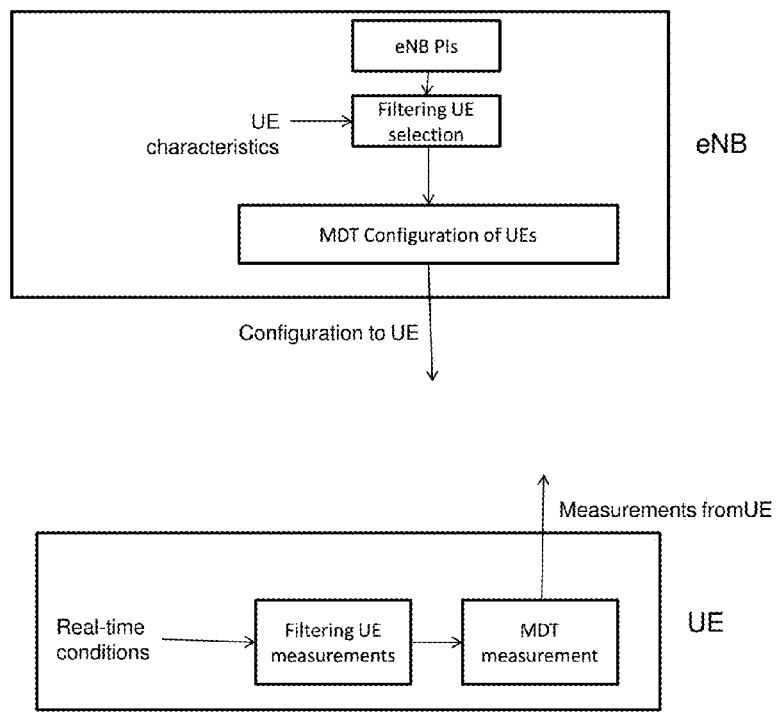
FIG. 4 shows a method according to a first embodiment of the present invention.

FIG. 4 shows a method according to a first embodiment of the present invention.

In FIG. 4 mechanisms according to the invention introduced in a base station in form of an evolved NodeB and user equipment are shown. In the evolved NodeB eNB performance indicators PI together with user equipment characteristics provide a filtering of the selection of user equipment for measuring network operation related parameters. The evolved NodeB eNB then provides a minimization of drive test MDT configuration of different user equipment and transmits the configuration information for the user equipment to the user equipment UE. On the other hand real-time conditions, for example measured signal conditions, speed, position, type of location/position information like RF fingerprint, detailed location information such as GPS, etc. are taken into account when filtering user equipment measurements. The user equipment performs measurements. These measurements are filtered according to real-time conditions. The filtered measurements are provided according to MDT and the user equipment reports the result of the measurement back to the evolved NodeB.

Figure 5:
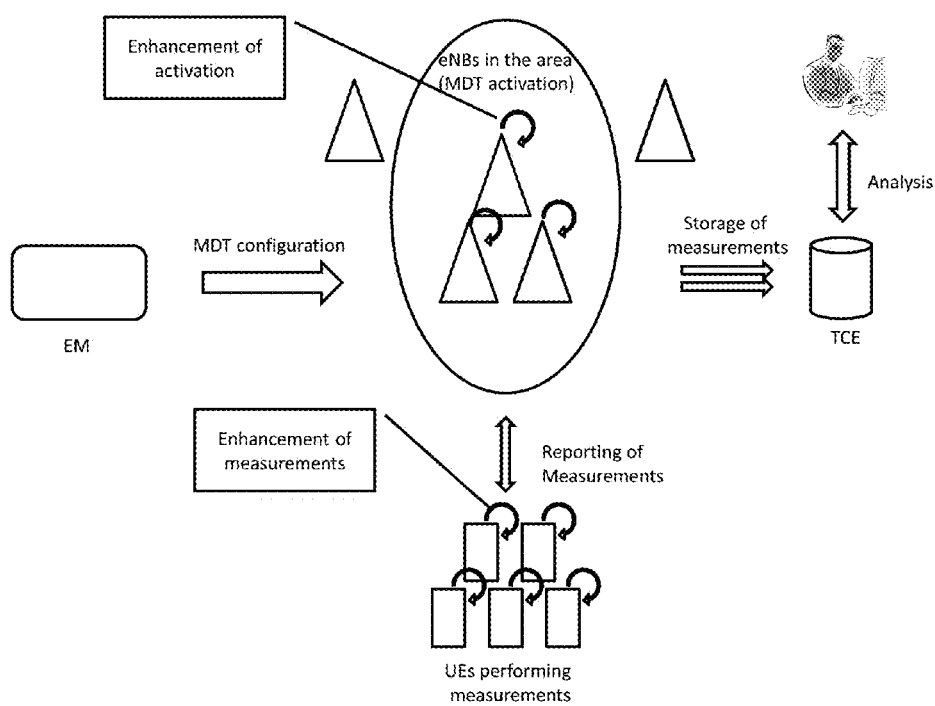
FIG. 5 shows a schematic view of signaling according to a second embodiment of the present invention.

FIG. 5 shows a schematic view of signaling according to a second embodiment of the present invention.

In FIG. 5 signalling between network components for usage by a minimization of drive test measurement performed by a user equipment is shown. An element manager EM sends MDT configurations to evolved NodeBs in the area, for which minimization of drive tests should be activated. MDT configuration data includes for example a type list of devices to be selected for measurement. Further a list of evolved NodeB dynamic conditions to activate/deactivate measurements based on performances of the evolved NodeB might be included. These conditions may be provided as a list of couples including performance indicator and a corresponding threshold. Example of performance indicators are the number of frames lost, the number of call drops, the number of frame errors, the number of time in overload conditions or the like. Further in the signaling between the element manager EM in the evolved NodeB a list of user equipment dynamic conditions to start/stop MDT measurements based on local information at the user equipment maybe provided, preferably as a list of couples including a parameter and a corresponding threshold. Example of user equipment parameters are position, received signals, strength, speed, battery level or the like.

When the evolved NodeB in the dedicated area have received the MDT configurations a filtering at the evolved NodeB might be performed. After the user equipment are selected for example based on an area scope a list of selected user equipment according to the filtering conditions is provided. The evolved NodeB starts a real-time control of the performance indicators at the evolved NodeB. If the performance indicator values indicate good conditions of the evolved NodeB then the minimization of drive test function is stopped, i.e. the measurements are filtered. This filtering occurs at the activation time of the filtering in the user equipment, i.e. the MDT measurement activation is filtered at the beginning and might also occur during the MDT measurements, i.e. an ongoing MDT measurement session is stopped.

When the filtering is performed at the activation step of the MDT measurement a stop command is send to the corresponding user equipment. When the filtering is deactivated a corresponding start command is send to the user equipment.

If for example a new user equipment is selected for MDT measurement and a filtering is active then no activation or start command is send to the new user equipment. When a deactivation or stop command is send to the user equipment or the MDT activation to the user equipment is blocked due to filtering, the evolved NodeB stores locally a user equipment context information to keep trace that the MDT measurements in the stopped or blocked user equipment have been filtered. This context needs to be transferred between different base stations in form of evolved NodeBs in case of a handover of the user equipment handing over from one base station to another base station. To send start/stop commands dedicated signaling may be used, i.e. by extending conventional RRC procedures between the user equipment and evolved NodeBs, or through broadcast signaling, i.e. by broadcasting the start/stop commands to all user equipment in the same cell of the evolved NodeB.

To provide a filtering at the user equipment the evolved NodeB transmits a list of dynamic conditions to be checked, like speed threshold, received signals, strength threshold, location data or the like.

When MDT measurements are activated in the user equipment real-time conditions of the user equipment are checked according to the transmitted list of dynamic conditions, for example speed, received signals, strengths or location. If the real-time conditions are not met, for example the received signal strength is very high or the user equipment is not moving or moving too fast, because in the latter case detailed location information may be less accurate, then the measurements are stopped according to the filtering at the user equipment. If the real-time conditions are met, MDT measurements are performed and then reported back to the evolved NodeB. At the evolved NodeB a filtering may be performed on the received MDT measurement data. After receiving the measurements the evolved NodeB filters them and avoids forwarding them to the trace collecting entity.

In particular FIG. 5 shows that MDT measurements may be reported from the user equipment to the evolved NodeBs, and MDT measurements are forwarded to the trace collecting entity as a database for storing these measurements by the evolved NodeB. Preprocessing of the stored data therefore is not needed to be performed to enable a later analysis by a user.

Figure 6:
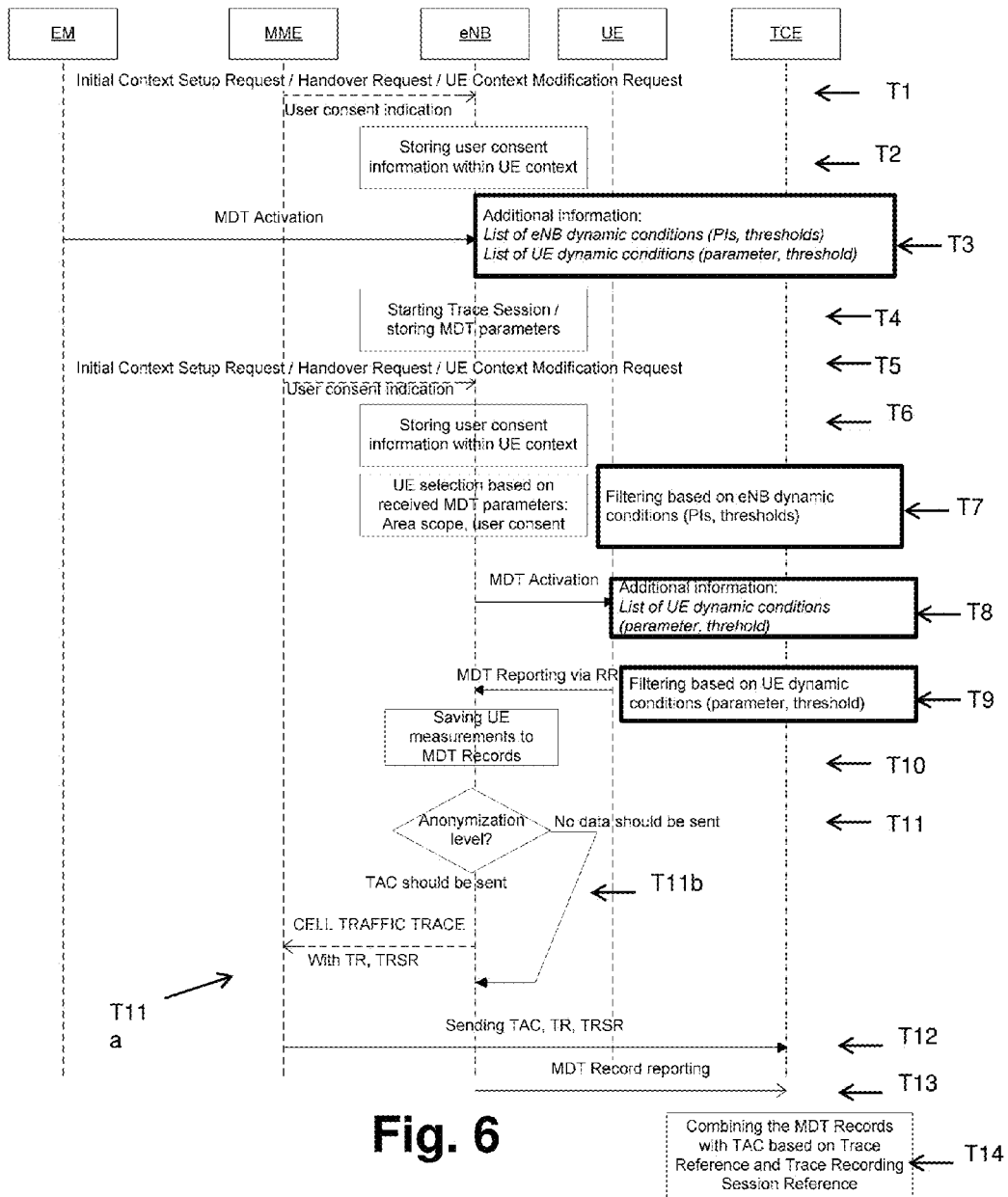
FIG. 6 shows a method according to a third embodiment of the present invention and FIG. 7 shows a method according to a fourth embodiment of the present invention.

FIG. 6 shows a method according to a third embodiment of the present invention.

FIG. 6 shows an MDT measurement activation in E-UTRAN according to the present invention. Steps T1 and T2 are the same as steps S1 and S2 in FIG. 1. In contrast to the first step S3 in FIG. 1 the third step T3 in FIG. 6 includes a transmission of additional information including a list of evolved NodeB dynamic conditions including performance indicators and thresholds and a list of user equipment dynamic conditions including parameters and corresponding thresholds.

The fourth to sixth step T4-T6 are the same as steps S4-S6 correspondingly in FIG. 1. In contrast to the seventh step S7 of FIG. 1 a seventh step T7 in FIG. 6 includes now a filtering based on the evolved NodeB dynamic conditions. In contrast to the eighth step S8 in FIG. 1 the eighth step T8 in FIG. 6 includes the transmission of additional information including a list of user equipment dynamic conditions with parameters and corresponding thresholds. In contrast to the step S9 of FIG. 1 the ninth step T9 in FIG. 6 includes a filtering based on user equipment dynamic conditions with parameters and thresholds before reporting the measurement to the evolved NodeB. The further steps T10-T14 are the same as the corresponding steps S10-S14 in FIG. 1.

Figure 7:
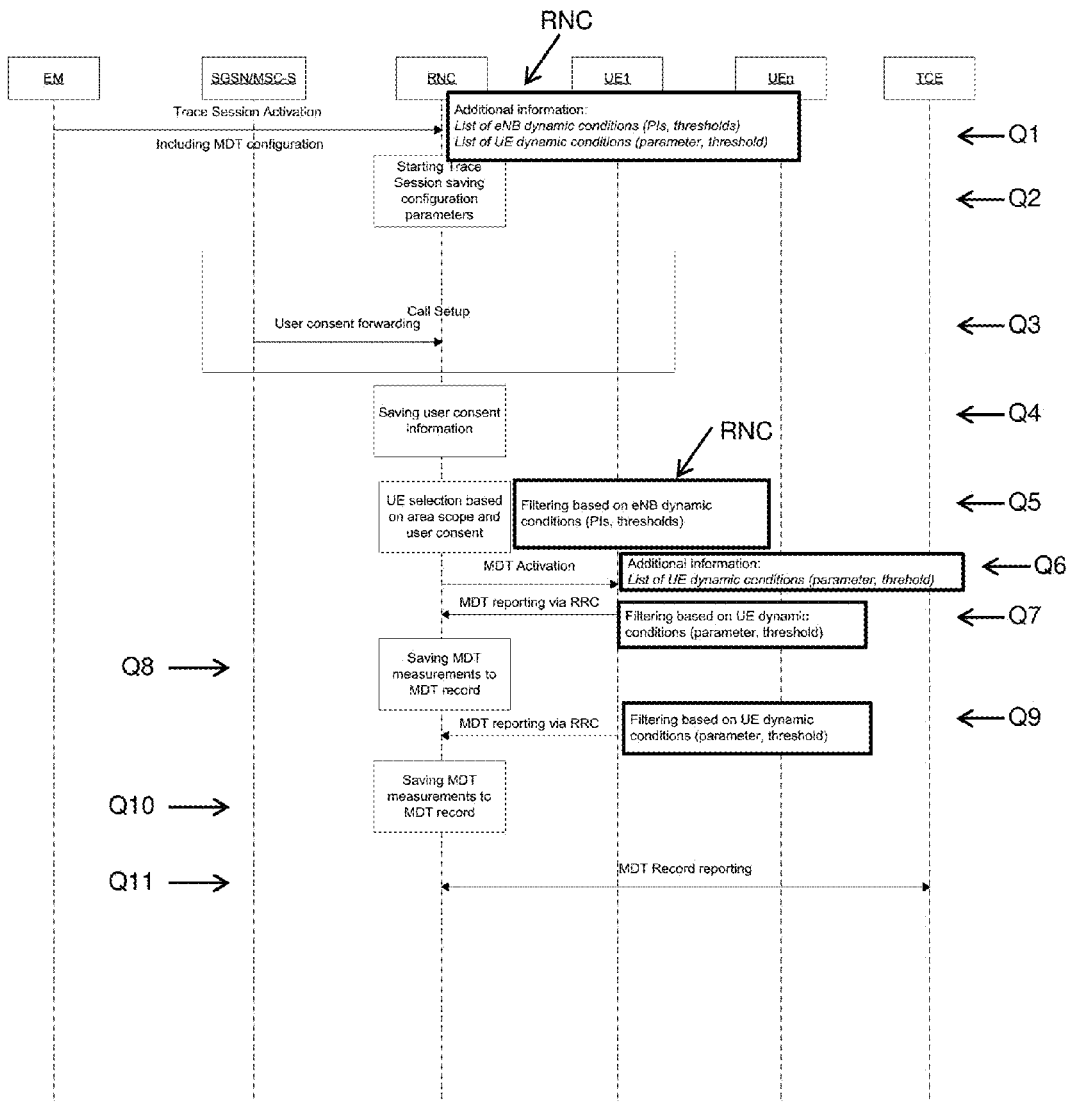

FIG. 7 shows a method according to a fourth embodiment of the present invention.

In FIG. 7 a signaling corresponding to FIG. 6 for a UMTS mobile communication network is shown. The first step Q1 corresponds to the first step R1 of FIG. 2. In contrast to the step R1 of FIG. 2 the first step Q1 in FIG. 7 includes additional information, for example the list of radio network controller dynamic conditions by performance indicators and corresponding thresholds and/or list of user equipment dynamic conditions, preferably in form of tuples of parameters with corresponding thresholds. The steps Q2-Q4 correspond to the steps R2-R4 of FIG. 2 and are identical. In contrast to the fifth step R5 of FIG. 2 the fifth step Q5 according to FIG. 7 includes a filtering based on the radio network controller dynamic conditions as transmitted in the first step Q1. In contrast to the sixth step R6 in FIG. 2 the sixth step Q6 in FIG. 7 includes further a filtering based on user equipment dynamic conditions based on parameters with corresponding thresholds before reporting the minimization of drive tests via RRC to the radio network controller. The eighth step Q8 corresponds to the eighth step R8 in FIG. 2. The steps Q7 and Q8 may be performed again in form of steps Q9 and Q10. The eleventh step Q11 in FIG. 7 corresponds to the eleventh step R11 in FIG. 2.

In summary the present invention provides a selection of MDT target devices based on dynamic information at the base station, preferably wherein dynamic information include performance indicate like frame losts, etc. and including a triggering from the base station to a user equipment to dynamically start and/or stop measurements of network operation related parameters. The present invention further provides a filtering of network operation related parameters measurements based on dynamic information at the user equipment and the base station, for example user equipment speed, radio signal strength or the like.

The present invention further provides inter alia the following advantages:
- a suppression of superfluous MDT measurements,
- MDT measurements work more efficiently and a high performance of network optimization based on the MDT measurements is provided,
- more scalable MDT measurements reducing signaling overhead and stored data and
- more accurate MDT measurements wherein only useful measurements are taken into account.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for measuring network operation related parameters in a mobile communication network with a core network and a radio-access network, preferably in form of a LTE- or UMTS-network, comprising the steps of:
   a) configuring an entity (eNB) in the mobile communication network for measuring including network operation related parameters to be measured,
   b) selecting a measuring entity (UE),
   c) measuring the network operation related parameters by the measuring entity (UE), and
   d) analysing the measured parameters,
   wherein a filtering is performed prior to step c),
   wherein the filtering is performed on the configured entity in the radio access network of the mobile communication network, and
   wherein the filtering reduces the amount of data of network operation related parameters for step d) to be transmitted between the measuring entity and the configured entity.

2. The method according to claim 1, wherein the configured entity (eNB), preferably being an entity of the radio access network, selects as measuring entity a user equipment (UE) connected to the configured entity (eNB).

3. The method according to claim 1, wherein the filtering is performed by selecting and/or activating the measuring entity (UE) for measurement according to measuring entity internal properties, preferably the type of the measuring entity (UE).

4. The method according to claim 1, wherein the filtering is performed by deselecting and/or deactivating the measuring entity (UE) for measurement according to step c).

5. The method according to claim 1, wherein network conditions are measured by another mobile communication network entity (eNB), preferably the base station (eNB), to which the measuring entity (UE) is connected.

6. The method according to claim 1, wherein filtering is performed according to measuring entity external information.

7. The method according to claim 1, wherein step a) includes providing a list of internal properties, external information and/or selecting, deselecting, activating and/or deactivating information.

8. The method according to claim 1, wherein the filtering is performed on the measuring entity (UE), preferably a user equipment.

9. The method according to claim 1, wherein the configured entity, preferably a base station (eNB), provides measured network conditions to the measuring entity, preferably a user equipment (UE) connected to the base station (eNB).

10. The method according to claim 1, wherein the filtering is performed by executing at least one filtering rule wherein filtering rules provide a filtering according to speed, received signal strength, location, and/or battery level of the measuring entity and/or according to accuracy of a measurement performed by the measuring entity.

11. The method according to claim 1, wherein the filtering is performed by executing at least one filtering rule wherein filtering rules provide a performance indicator and a corresponding threshold, preferably wherein a performance parameter represents a number of lost frames, number of call drops, number of frame errors and/or percentage of time in an overload condition.

12. The method according to claim 1, wherein selecting, deselecting, activating and/or deactivating the measuring entity (UE) for measurement is performed by dedicated signaling and/or broadcast corresponding commands to the measuring entity (UE).

13. A system for measuring network operation related parameters in a mobile communication network with a core network and a radio access network preferably in form of a LTE or UMTS network, preferably for performing with a method according to claim 1, comprising:
  a measuring entity (UE), preferably a user equipment, configured to be operable to perform network related measurements, preferably radio measurements,
  a configured entity (eNB), preferably a base station, to which the measuring entity (UE) is connectable,
  a configuring entity (EM) configured to be operable to configure the configured entity (eNB) for measurement, including network operation related parameters to be measured,
  a selection entity (eNB) configured to be operable to select the measuring entity (UE) connected to the configured entity (eNB), for measurement and
  an analyzing entity (TCE) configured to be operable to analyse measured data of the network operation related parameters and connected to the configured entity (eNB),
  wherein said configured entity (eNB) in the radio access in the radio access network of the mobile communication network is configured to be operable to perform a filtering before the measuring entity measures network operation related parameters, and
  wherein the filtering reduces the amount of data of network operation related parameters transmitted between the configured entity and the measuring entity.

14. The system according to claim 13, wherein the configuring entity (EM) and/or the analyzing entity (TCE) are core network entities of the mobile communication network.

* * * * *